(12) United States Patent
Cirette et al.

(10) Patent No.: US 10,118,330 B2
(45) Date of Patent: Nov. 6, 2018

(54) MOLDING UNIT COMPRISING MOLD BOTTOM ACTUATION MEANS SUPPORTED BY A FIXED HOLDER

(71) Applicant: SIDEL PARTICIPATIONS, Octeville-sur-Mer (FR)

(72) Inventors: Damien Cirette, Octeville-sur-Mer (FR); Yves Roche, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 197 days.

(21) Appl. No.: 15/304,606

(22) PCT Filed: Apr. 2, 2015

(86) PCT No.: PCT/EP2015/057374
§ 371 (c)(1),
(2) Date: Oct. 17, 2016

(87) PCT Pub. No.: WO2015/158559
PCT Pub. Date: Oct. 22, 2015

(65) Prior Publication Data
US 2017/0036389 A1 Feb. 9, 2017

(30) Foreign Application Priority Data
Apr. 16, 2014 (FR) .................................... 14 53396

(51) Int. Cl.
*B29C 49/48* (2006.01)
*B29C 49/12* (2006.01)
(Continued)

(52) U.S. Cl.
CPC .............. *B29C 49/48* (2013.01); *B29C 49/12* (2013.01); *B29C 49/30* (2013.01); *B29C 49/36* (2013.01);
(Continued)

(58) Field of Classification Search
CPC ............ B29C 49/48; B29C 2049/4858; B29C 2049/4892; B29C 49/4236
See application file for complete search history.

(56) References Cited

U.S. PATENT DOCUMENTS 5,785,921 A 7/1998 Outreman et al.
9,975,303 B2 * 5/2018 Geltinger ............. B29D 22/003
(Continued)

FOREIGN PATENT DOCUMENTS

CA 2939939 A1 * 9/2015 ............. B29C 49/28
EP 2626190 A1 * 8/2013 ......... B29C 49/4236
(Continued)

OTHER PUBLICATIONS

International Search Report, dated Jul. 2, 2015, from corresponding PCT Application.

*Primary Examiner* — Robert B Davis
(74) *Attorney, Agent, or Firm* — Young & Thompson (57) ABSTRACT

A molding unit (10) for forming a container made of thermoplastic material, includes: —a mold bottom (16) that is movable between a low position, an intermediate boxing position and a high position; —a carriage (24) that supports the mold bottom (16) and is mounted in a movable manner in a fixed holder (26); —actuation elements for moving the carriage (24) into its intermediate boxing position; —the actuation elements including a cylinder (32) that houses a piston (98) liable to push the mold bottom (16) through a boxing travel; characterized in that the mold bottom (16) is supported in a fixed manner by the carriage (24), the cylinder (32) being fixed with respect to the fixed holder (26). A method for employing the molding unit is also described.

15 Claims, 8 Drawing Sheets

(51) Int. Cl.
  *B29C 49/36* (2006.01)
  *B29C 49/70* (2006.01)
  *B29C 49/30* (2006.01)
  *B29K 67/00* (2006.01)
  *B29C 49/06* (2006.01)
  *B29K 101/12* (2006.01)
  *B29K 105/00* (2006.01)
  *B29L 31/00* (2006.01)

(52) U.S. Cl.
  CPC .......... *B29C 49/4823* (2013.01); *B29C 49/70* (2013.01); *B29C 49/06* (2013.01); *B29C 2049/4858* (2013.01); *B29C 2049/4892* (2013.01); *B29K 2067/003* (2013.01); *B29K 2101/12* (2013.01); *B29K 2105/253* (2013.01); *B29L 2031/7158* (2013.01)

(56) References Cited

U.S. PATENT DOCUMENTS

| | | |
|---|---|---|
| 2008/0063742 A1 | 3/2008 | Legallais et al. |
| 2012/0052148 A1 | 3/2012 | Langlois |
| 2013/0224325 A1* | 8/2013 | Langlois ................ B29C 49/541 |
| | | 425/541 |
| 2017/0144357 A1* | 5/2017 | Haboury ................ B29C 49/78 |

FOREIGN PATENT DOCUMENTS

| | | | |
|---|---|---|---|
| EP | 2937203 A1 * | 10/2015 | .......... B29D 22/003 |
| FR | 2 508 004 A1 | 12/1982 | |
| FR | 2 945 469 A1 | 11/2010 | |
| FR | 2990135 A1 * | 11/2013 | ............... A61L 2/10 |
| JP | 2008-254244 A | 10/2008 | |

* cited by examiner

Fig. 8

MOLDING UNIT COMPRISING MOLD BOTTOM ACTUATION MEANS SUPPORTED BY A FIXED HOLDER

TECHNICAL FIELD OF THE INVENTION

The invention relates to a molding unit for the forming of a container made of thermoplastic material by blow molding, particularly by stretch blow molding, of a preform, the molding unit having a mold bottom that is mobile over a boxing path.

TECHNICAL BACKGROUND OF THE INVENTION

The invention relates more particularly to a molding unit for the forming of a container made of thermoplastic material by blow molding, particularly by stretch blow molding, of a preform, the molding unit having:
  two half-molds that are transversely mobile relative to a fixed holder between a molding joined position and a separated position for extraction of the finished container;
  a mold bottom that is vertically mobile between a lower position for extraction of the finished container and an upper position for molding of a base of the container, the mold bottom being able to be moved between the two half-molds in a molding joined position over a directed path, termed boxing, which extends from an initial intermediate boxing position to its upper molding position;
  a carriage that carries the mold bottom and that is mounted to move in the fixed holder;
  first actuation means to move the carriage relative to its fixed holder between a lower position of the mold bottom and its initial intermediate boxing position;
  second actuation means having at least one cylinder housing a piston sliding vertically that is able to push the mold bottom over its boxing path by pressurizing a lower work chamber of the cylinder.

Such mold units having a device to perform a so-called "boxing" operation of the base of a container, such as in particular a bottle made of thermoplastic material, are known in the state of the art.

Such a boxing operation is, for example, described in the document FR 2,508,004 to which reference will be made, in a nonlimiting way, for further details about this forming technique.

The boxing operation corresponds to a forming technique used during the manufacture of containers for which particular characteristics are sought, particularly of material with structural rigidity at the base thereof, for example for certain plastic bottles made of PET (polyethylene terephthalate).

This forming technique is particularly, but not exclusively, used for the purpose of manufacturing containers such as those bottles that are intended to be filled "hot," i.e., filled with a liquid to be packaged whose temperature is, for example, between 60° C. and 95° C. It makes it possible to obtain a flexible base that forms a membrane that is deformed under the action of the partial vacuum created by the cooling of the hot liquid contained in the sealed container.

This technique is further able to be used to reduce the amount of material present in the base of the container whose weight it is desired to reduce so as to lower its cost and/or even for esthetic reasons.

The boxing technique consists in moving, during forming, the portion of the mold intended for the molding of the base of the container, called "mold bottom" in the following description, or even "mold of the bottom" in the previously referenced document. This movement is performed while the material that makes up the (formed or forming) preform or container still has a temperature appropriate for deformation. This movement makes it possible at the mold bottom to stretch the material that makes up the base of the container. The mold bottom thus rises like a fist to "box" the base of the container during forming, hence the name of the boxing operation.

In known molding installations that do not use a boxing operation, it is already known to move the mold bottom between its lower position for extraction of the container and its molding position by means of a cam actuation device. Such a device makes it possible in particular to obtain a rapid and precise control of the movements of the mold bottom. Such rapidity of actuation is not possible with a pneumatic cylinder. Nevertheless, the cam actuation devices do not make it possible to obtain enough force to perform a boxing operation.

To solve this problem, it has been proposed to control the movements of the mold bottom by means of a first cam actuation device that makes possible a rapid and precise positioning of the mold bottom, and by means of a second pneumatic actuation device that makes it possible to move the mold bottom over its boxing path with enough force to perform the boxing operation.

FIGS. 5 to 8 of the document FR-2,508,004 represent the main steps of this technique and illustrate an example of a boxing operation implemented during the forming of a bottle made of thermoplastic material.

By comparison with a conventional mold having two half-molds and a separate mold bottom, the mold bottom is not axially immobilized by the joined half-molds, but it is able to be moved axially by actuation means between an initial intermediate boxing position (low position) and a final upper molding position (high position).

In FIG. 5 that illustrates a first step, the mold bottom is moved toward the half-molds to occupy the initial position in which it is positioned axially retracted so as to ensure that the axial dimension (height) of the molding cavity is greater than that of the body of the final container.

A preform, introduced into the mold, extends axially through an opening coming out into a molding cavity that delimits the two half-molds associated with the mold bottom, said half-molds mounted to move between a separated position and a joined position (shown in FIG. 5).

In FIG. 6 that illustrates a second step, the preform is stretched axially by a stretching rod until reaching approximately the uppermost part of the mold bottom.

The mold bottom then still occupies its initial intermediate boxing position; the axial stretching of the preform is accomplished along a maximum stretching path that is greater than the height of the container (bottle), or with an over-travel corresponding to the difference between the initial intermediate boxing position and the final molding position of the mold bottom. In this final molding position, the axial dimension of the molding cavity corresponds to that of the final container.

Such a stretching operation is performed in combination with a blow-molding operation, preferably respectively preceded by a pre-blow molding, so as to obtain a bi-axial stretching, i.e., a bi-axial molecular orientation of the material whereby the structural rigidity of the base of the container in particular is improved.

At the completion of this second step, the base of the container here is not yet formed, and the material still has a deformation temperature. The mold bottom is then moved axially upward by associated actuation means, from the initial position up to the final molding position illustrated in FIG. 8.

The mold bottom travels an axial boxing path during which said mold bottom will stretch the material by axially pushing the base in the direction of the interior of the container.

However, according to the application, the techniques vary and the boxing operation is able to be accomplished during or after the forming of the container that is ultimately formed by a blow-molding operation at a blow-molding pressure.

The final blow-molding pressure can reach values on the order of 20 to 40 bars depending on the applications, or as a consequence of the values commonly considered as high pressures.

With the exception of the boxing operation, the forming of the container is consequently performed in a conventional manner by stretch blow molding of a preform made of thermoplastic material previously thermally conditioned for this purpose, with one or more blow-molding steps consisting in injecting a pressurized fluid, generally air, into the interior of the preform.

Of course, the description that has just been given is in no way limiting, and various variants or improvements can be made to it to perform the boxing operation.

To perform such a boxing operation of the base of the container during its forming, a device of the type described previously equips each container molding unit of the machine.

Such a molding unit has actuation means that are intended to move selectively the mold bottom between said initial intermediate boxing and final molding positions.

The document FR-2,945,469 describes an example of actuation means of such a molding unit that is able to perform a boxing operation.

According to this document, the actuation means of the mold bottom consist of a simple cylinder operating by means of a fluid under pressure formed by compressed air. The pneumatic cylinder is supported by a carriage that makes it possible to move the mold bottom from a lower extraction position to its initial intermediate boxing position. The cylinder is then actuated to move the mold bottom over its boxing path.

The device for performing the boxing according to this document and in particular the actuation means formed by such a cylinder, however, are not entirely satisfactory.

Actually, such a device is particularly cumbersome, and it does not make it possible to manufacture the containers in series with a rate as sustained as for containers manufactured without a boxing operation. This decline in rate is particularly due to the significant weight of the carriage thus provided.

The object of the invention is therefore to solve in particular the above-cited drawbacks and even to propose a new device design to perform the boxing operation that is advantageously simple, reliable, cost-effective, and especially rapid.

BRIEF SUMMARY OF THE INVENTION

The invention proposes a molding unit of the type described previously, characterized in that the mold bottom is supported in a fixed manner by the carriage, the cylinder being stationary in relation to the fixed holder.

According to other characteristics of the invention:
the fixed holder has an upper stop face that limits the movement of the carriage upward into the upper position of the mold bottom;
the upper stop face is supported by a removable first element that is attached in a detachable manner on the fixed holder;
at least one of the half-molds has a lower stop face that limits the movement of the carriage downward into its initial intermediate boxing position when the half-molds occupy their molding joined position;
the lower stop face is supported by a removable second element that is attached in a detachable way under the associated half-mold;
the mold bottom has a stop face that is intended to come into contact with the lower stop face;
the first actuation means have elastic return means that exert an elastic return force on the carriage toward its upper molding position;
the first actuation means have a cam follower that is supported by the carriage and a cam path that works with the cam follower to make the carriage slide to its lower position against the elastic return force;
the first actuation means have an arming device that can exert an arming force on the carriage to move it from its upper position to its initial intermediate boxing position against the elastic return force over a directed reverse arming path relative to the boxing path;
the first actuation means have a cylinder that is supported by the fixed holder;
the arming force that can be exerted by the cylinder is much less than the boxing force that can be exerted by the piston on the carriage;
the piston slides freely in relation to the carriage, the carriage being able to slide between its lower position and its upper position while the piston remains fixed.

The invention also relates to a method of forming a container by blow molding a preform using the molding unit made according to the teachings of the invention, characterized in that it comprises chronologically:
a first, positioning step, the mold bottom initially occupying its lower position and the half-molds initially occupying their separated position, during which the mold bottom is moved to its upper position, then during which the two half-molds are moved to their molding joined position;
then, a second, arming step during which the carriage is moved along its arming path to its initial intermediate boxing position;
then, a third, boxing step that takes place during the forming of a preform inserted into the mold after the first step, and during which the carriage is moved along its boxing path by means of the piston so as to stretch the material of the preform in the process of forming to form the base of the container;
then, a fourth step for extraction of the finished container during which the carriage is moved from its upper position to its lower position after opening of the two half-molds into their separated position.

BRIEF DESCRIPTION OF THE FIGURES

Other characteristics and advantages of the invention will come out during the reading of the following detailed description for the understanding of which reference will be made to the accompanying drawings in which.

DETAILED DESCRIPTION OF THE FIGURES

In the following description, elements that have an identical structure or similar functions will be designated by the same reference.

In the following description, longitudinal orientations directed from back to front, vertical directed from bottom to top, and transverse directed from left to right that are indicated by the trihedron "L, V, T." of the figures will be adopted in a nonlimiting way. These orientations are linked to the fixed holder of the molding unit, the longitudinal direction being tangent to the trajectory of the molding unit during the rotation of the carousel.

Figure 1:
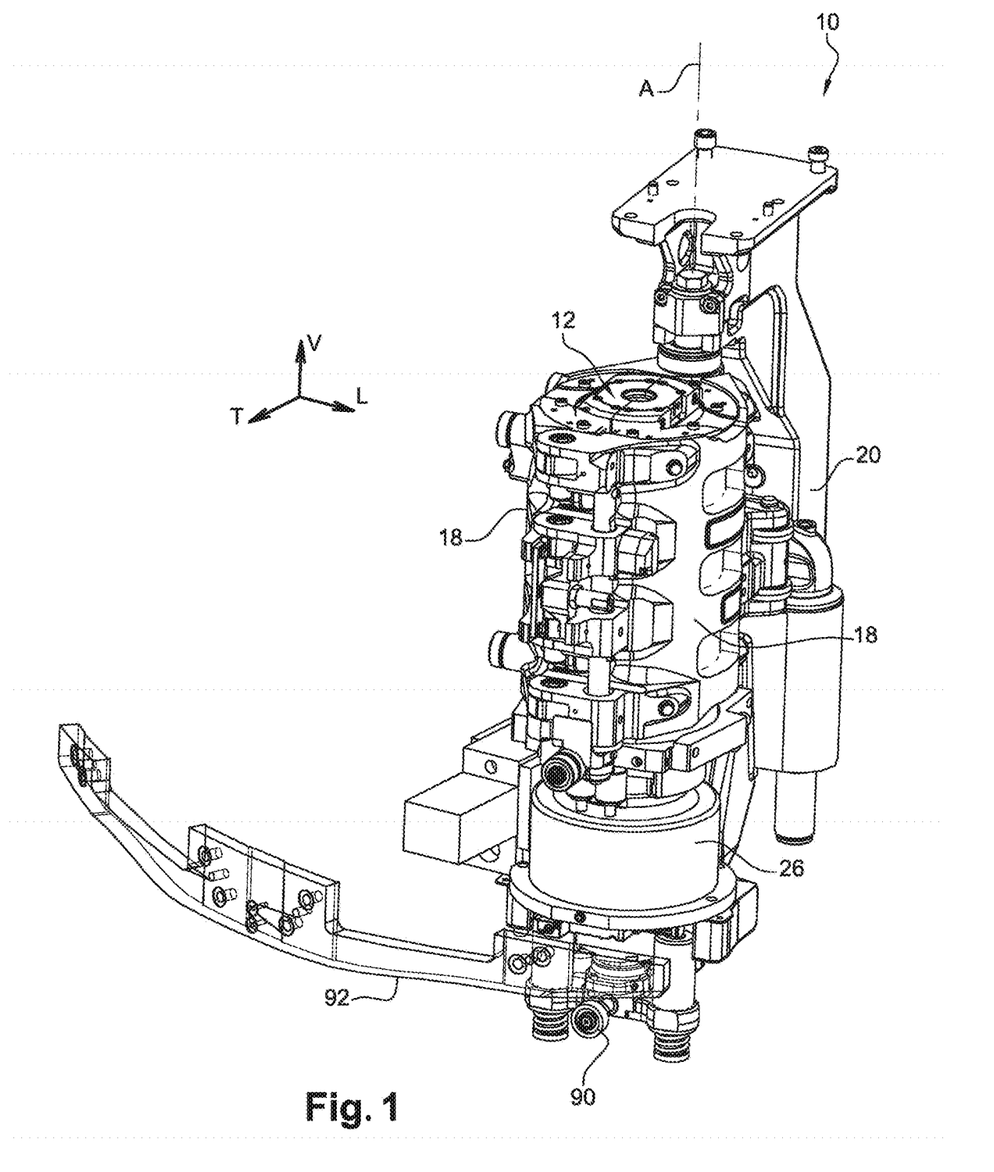
FIG. 1 is a perspective view that shows a molding unit made according to the teachings of the invention in which the half-molds occupy their molding joined position, and in which the mold bottom occupies its upper molding position.

FIG. 1 shows a molding unit 10 for the mass-produced forming of containers made of thermoplastic material by blow molding, particularly by stretch blow molding, of a previously heated preform. The final container is, for example, formed into a bottle.

Such a molding unit 10 is part of a blow-molding machine that generally has several identical molding units distributed on the periphery of a carousel (not shown). The molding unit 10 is thus able to be moved along a circular trajectory relative to the ground on which the blow-molding machine is placed.

The molding unit 10 comprises a blow-molding mold 12. As shown in greater detail in FIG. 2, the blow-molding mold 12 comprises, in a known way:
  two half-molds 14, sometimes called "shells," which carry an impression 15 of a body of the container with a vertical axis "B" to be obtained; and
  a mold bottom 16 that carries an impression 17 of the base, or bottom, of said container.

Figure 2:
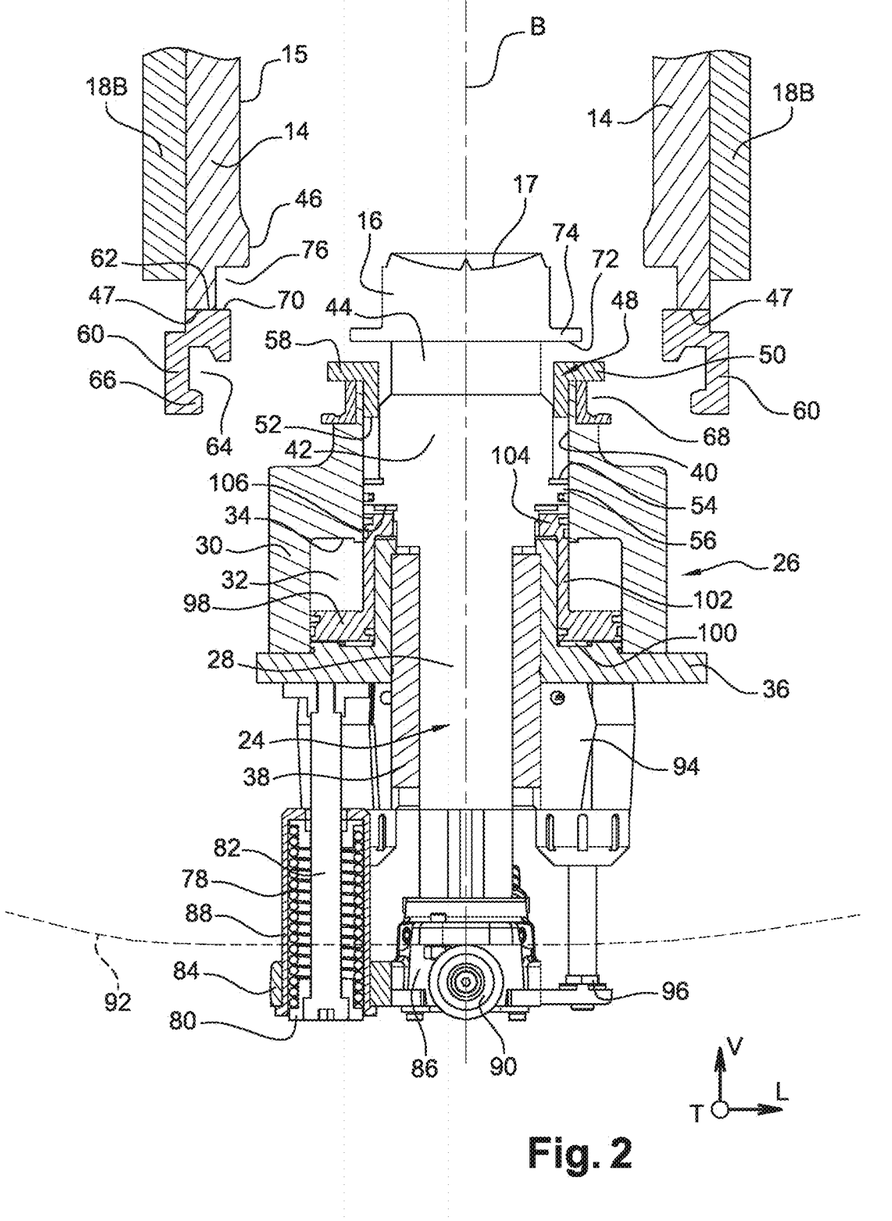
FIG. 2 is a cross-sectional view along the cutting plane 2-2 of FIG. 4 and in which the half-molds occupy their separated position while the mold bottom occupies its lower position for extraction.

The mold bottom 16 and the half-molds 14 can be changed as a function of the shape of the final container to be obtained.

Figure 3:
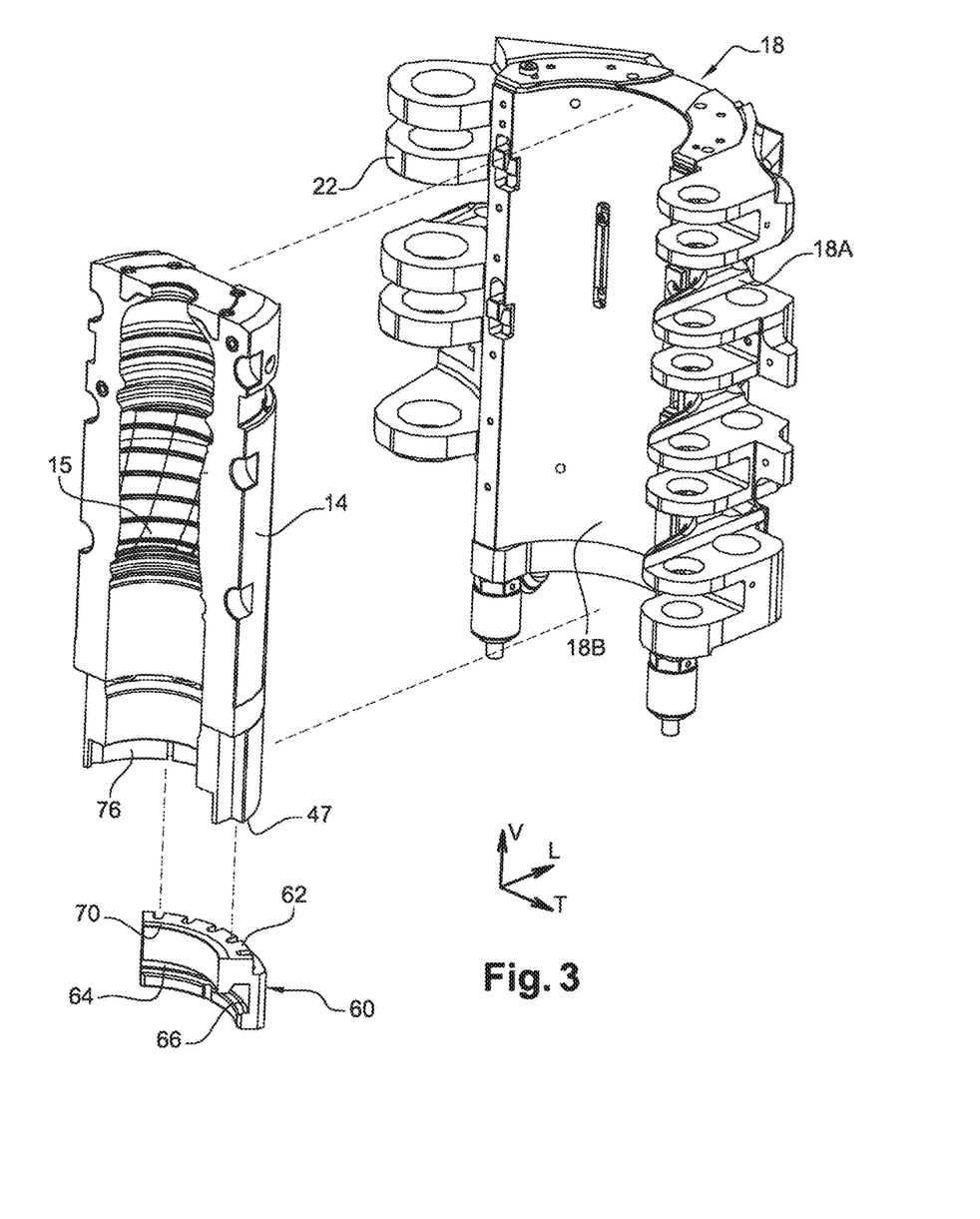
FIG. 3 is an exploded perspective view that shows a half-mold, a jaw associated with the half-mold and an associated mold holder.

The half-molds 14 are generally attached in a removable way in mold holders 18, or mold carriers, shown for example in FIG. 3. Each mold holder 18 is supported by a frame 20, or bracket, shown in FIG. 1. The frame 20 is intended to be supported by the carousel.

Figure 4:
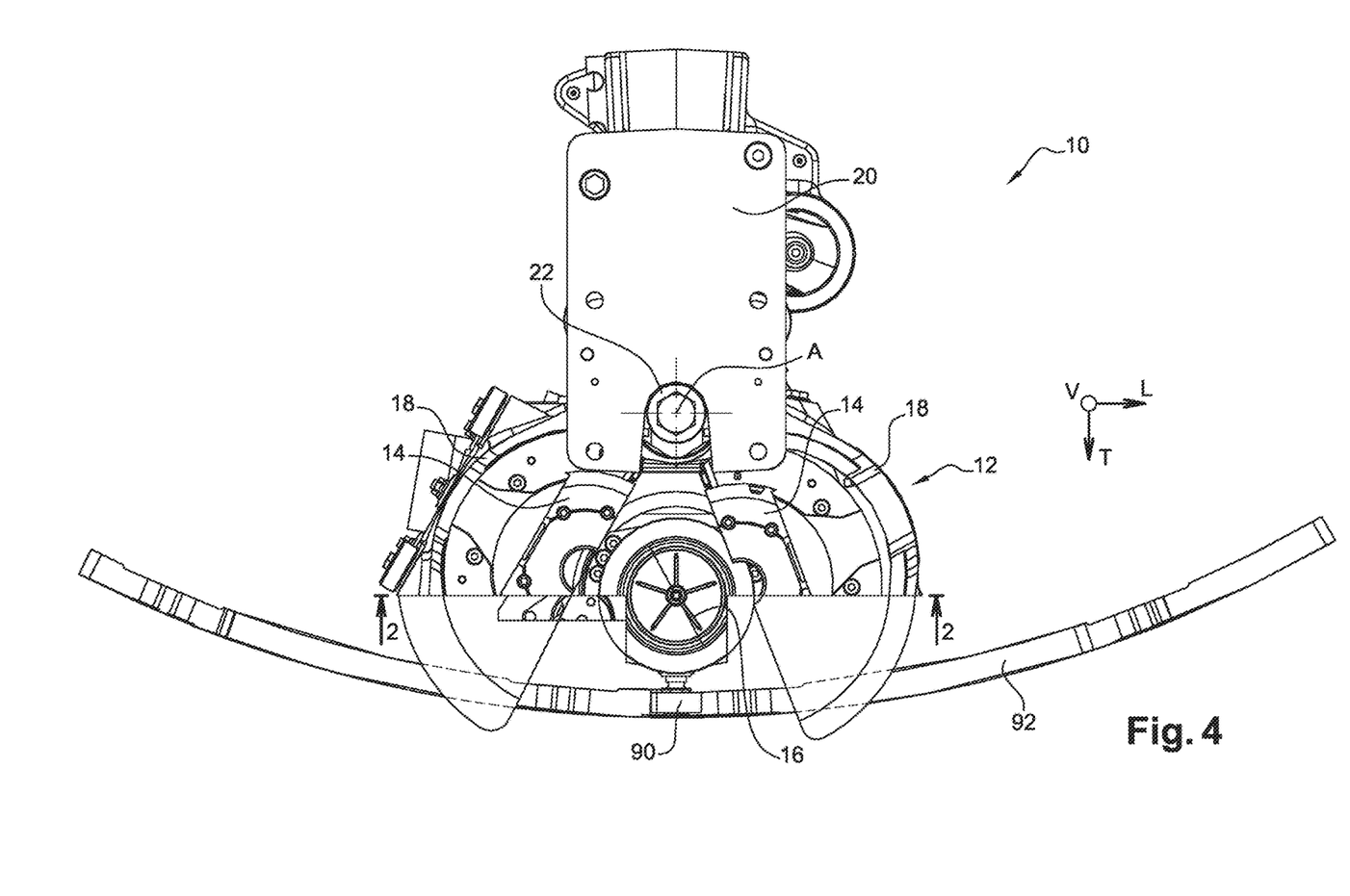
FIG. 4 is a top view of the molding unit of FIG. 1 in which the molding unit is in a state corresponding to the state shown in FIG. 2.
Figure 5:
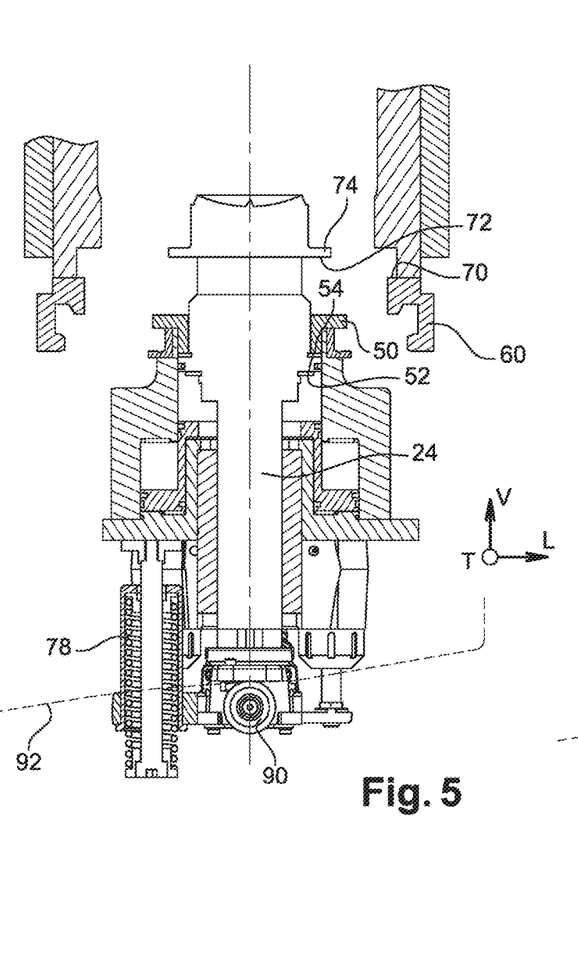
FIG. 5 is a cross-sectional view similar to that of FIG. 2 that shows the half-molds in separated position and the mold bottom in its upper molding position.

The mold holders 18 are mounted to pivot on the frame 20 by means of a common lateral hinge 22 with a vertical axis "A," as shown in FIG. 4. The two half-molds 14 are thus mobile longitudinally between a separated position for extraction of the finished container, as shown in FIGS. 2, 4 and 5, and a molding joined position of the container, as shown in FIGS. 6 to 10.

In a known way, and as shown in FIG. 3, each mold holder 18 is formed by a bracket 18A that comprises the hinge 22 and by a mold-carrier 18B, also called a shell-carrier, which is mounted on said bracket 18A. The mold-carrier 18B is designed to accommodate the associated half-mold 14. The mold-carrier 18B generally comprises a circuit of coolant that makes it possible to regulate the temperature of the half-mold 14. Further, the mold-carrier 18B is mounted on the bracket 18A with a longitudinal play that makes it possible to ensure that the two half-molds 14 are effectively joined during the molding thanks to well-known compensation means that will not be described in greater detail hereafter. The half-mold 14 is attached in a rigid but detachable manner to the associated mold-carrier 18B.

As a variant, the half-mold 14 also comprises a fluid circuit.

In FIGS. 2 and 5 to 11, only the mold-carrier 18B has been shown for reasons of clarity.

Referring to FIG. 2, the mold bottom 16 is supported in a fixed manner by a carriage 24 that is mounted to move vertically in a fixed holder 26 relative to the frame 20 of the molding unit 10. The carriage 24 and the mold bottom 16 thus form a single-piece assembly. The carriage 24 has a cylindrical central portion 28 with a vertical axis that is coaxial to the axis "B" of the impression 15.

The fixed holder 26 has an upper end hood 30 that radially delimits a cylindrical recess, designated hereafter as "cylinder 32," with an axis "B" that is coaxial with the impression 15. The cylinder 32 is delimited toward the top by an upper wall 34 of the hood 30, and it is closed toward the bottom by a lower horizontal cover 36.

The cover 36 is passed through at its center by a fixed guiding bearing 38 sliding vertically that receives the central portion 28 of the carriage 24. The bearing 38 thus goes through the cylinder 32. The hood 30 is also passed through vertically at its center by a shaft 40 for passage of the carriage 24 that comes out axially under the cavity of the half-shells 14 in the closed position.

To enable the changing of the mold bottom 16, the upper end of the carriage 24 has a saddle 42 that is intended to make possible the rapid fixing of the mold bottom 16 onto the carriage 24. The saddle 42 is located at an upper end of the central portion 28. The saddle 42 is housed in the upper end shaft 40 of the hood of the fixed holder 26.

As will be explained in greater detail below, the carriage 24 can thus slide vertically between:
- a lower end position for extraction of a finished container, as shown in FIG. 2, in which the mold bottom 16 is positioned below the impression 15 of the half-molds 14; and
- an upper end position for molding of the base of the container, as shown in FIGS. 5, 7, 9 and 10, in which the mold bottom 16 is positioned between the half-molds 14 so as to complete the impression 15 of the final container.

In the embodiment shown in the figures, a spacer 44 is inserted between the mold bottom 16 and the saddle 42 to make it possible to adjust vertically the position of the mold bottom 16 relative to the two half-molds 14. Depending on the height of the final container, it is possible to change the spacer, and even to eliminate the spacer.

Further, the molding unit 24 is able to perform a boxing operation. For this purpose, the mold bottom 16 must be able to slide vertically between the two half-molds 14 occupying their closed molding position. For this purpose, the half-molds 14 have, in the closed position, a vertical cylindrical opening 46 that comes out toward the bottom in a lower face 47 of the half-molds 14 in line with the shaft 40 of the fixed holder 26 and toward the top in the cavity delimited by the impression 15 of the body of the container.

To limit the movement of the carriage 24 toward the top into its upper end position, a removable stop ring 48 is attached in a detachable way at an upper end of the shaft 40 of the fixed holder 26.

The stop ring 48 has a tubular shape. A collar 50 extends radially outward from an upper end edge of the stop ring 48. The tubular portion of the stop ring 48 is received into the shaft 40 so as to be inserted radially between the saddle 42 and the internal cylindrical face of the shaft 40. The lower end circular edge of the stop ring 48 forms an upper stop face 52 that limits the movement of the carriage 24 toward the top into the upper position of the mold bottom 16.

For this purpose, the carriage has a first stop face 54 that is oriented vertically toward the top, opposite the stop face 52. The first stop face 54 is supported by a first collet 56 that extends radially toward the outside from a peripheral cylindrical face of the saddle 42.

The collar 50 of the stop ring 48 is placed on an upper end horizontal edge 58 of the shaft 40. The periphery of the collar 42 is flush radially with the periphery of the upper edge 58 of the shaft 40.

The stop ring 48 is attached to the hood 30 of the fixed holder 26 by bolts (not shown) passing through the collar 50. It is thus possible easily to remove the collar 50 when no boxing operation is required, as will be explained in more detail below. Thus, the upper stop face 52 is supported by a first removable element, here the stop ring 48, which is attached in a removable way on the fixed holder 26, here by a bolt.

During a stretch-blow-molding operation, it is known to immobilize the half-molds 14 in the closed position relative to the mold bottom 16. This makes it possible to obtain a precise molding of the impression by avoiding having ridges of material appear on the final container in the area of the joint planes.

In the molding unit 10 made according to the teachings of the invention, the carriage 24 must be able to slide vertically relative to the half-molds 14 in the closed position. To make possible a precise positioning of the mold bottom 16 relative to the half-molds 14, two devices are used.

First of all, the half-molds 14 are closed on the fixed holder 26. The assembly is locked by fitting of elements with complementary shapes between the half-molds 14 and the fixed holder 26.

As shown in particular in FIGS. 2 and 3, each half-mold 14 is equipped with an associated locking jaw 60. Each jaw 60 has an annular sector shape that matches the shape of the lower face 47 of the associated half-mold 14. An upper face 62 of the jaw 60 is applied against the lower face 47 of the half-mold 14, and then the jaw 60 is attached in a removable way directly onto the half-mold 14, for example by means of bolts.

As a variant of the invention, not shown, since the half-mold 14 is attached in a rigid manner in its mold carrier, the jaws 60 are attached under the lower face of the mold carriers. Since the half-mold 14 is fixed relative to the associated mold carrier, each jaw is attached under the associated half-mold by means of the mold carrier. In this case, the jaws 60 are attached permanently on the molding unit, and it is not necessary to remove them for each mold changing.

Each jaw 60 has on its concave face, directed radially toward the axis "B" of the impression 15, an open groove 64 opposite the collar 50 of the stop ring 48, as is shown in FIG. 2. The groove 64 is delimited at the bottom by a rim 66 that projects radially toward the interior.

Figure 7:
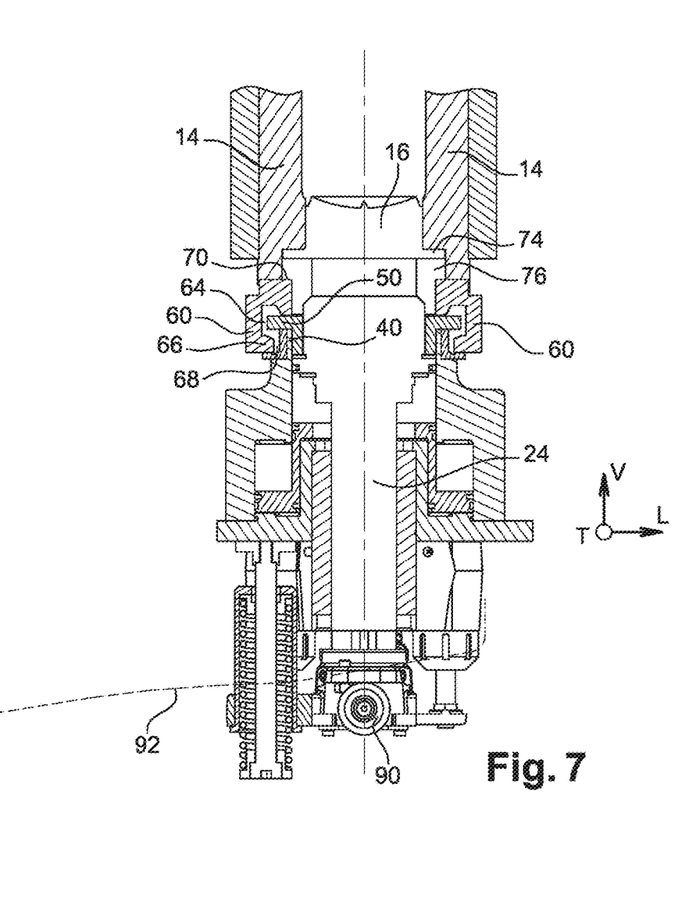
FIG. 7 is a view similar to that of FIG. 2 in which the half-molds occupy their joined position while the mold bottom occupies its upper molding position.

When the half-molds 14 are activated in their molding joined position, as is illustrated in FIG. 7, the jaws 60 grip an upper end segment of the shaft 40. The shaft 40 has on its outer face a groove 68 that receives the rim 66 of the jaws 60. The collar 50 of the stop ring 48 and a rim of the shaft 40 are also received in the groove 64 of the jaws 60. These first locking means make it possible to immobilize the half-molds 14 vertically in the closed position relative to the fixed holder 26, knowing that the carriage 24 is itself guided precisely to slide in the fixed holder 26.

The first locking means make it possible to hold the half-molds 14 in position relative to the fixed holder 26 during the blow-molding operation and during the boxing operation during which operations the blow-molding fluid pressure applies extremely intense forces on the half-molds 14 and on the mold bottom 16.

To implement the boxing operation, the mold bottom 16 can be moved between the two half-molds 14 in a molding joined position on a directed path, known as boxing, extending from a well-defined initial intermediate boxing position to its upper molding position. Said intermediate position forms an initial boxing position in which the mold bottom 16 is arranged above its lower extraction position.

Figure 8:
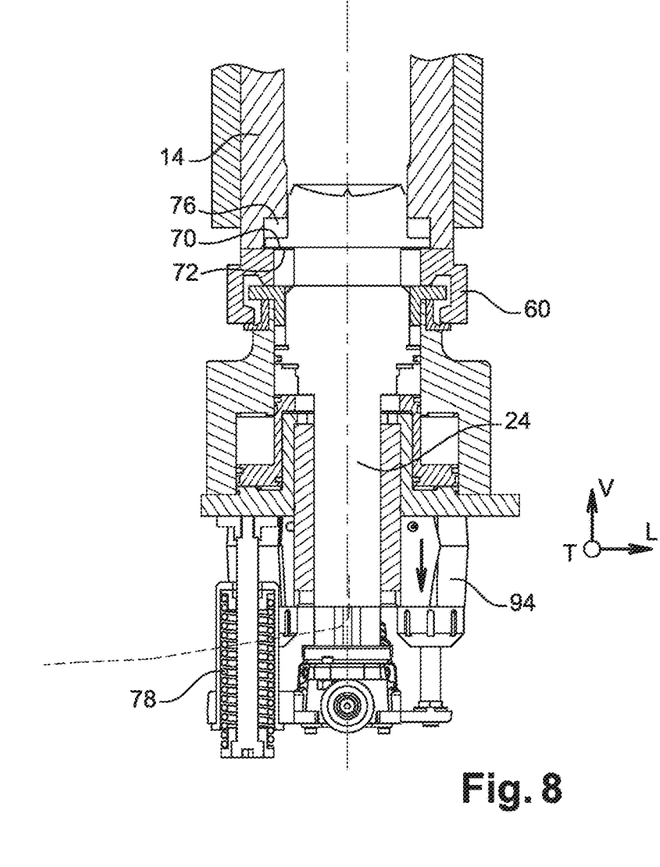
FIG. 8 is a view similar to that of FIG. 2 in which the half-molds occupy their joined position, while the mold bottom occupies its initial intermediate boxing position.

The initial intermediate boxing position must be defined precisely so that the length of the boxing path is matched to the shape of the container to be formed. For this purpose, the carriage 24 is stopped in its initial intermediate boxing position by contact with a lower stop face 70. At least one of the half-molds 14 comprises the lower stop face 70 that limits the movement of the carriage 24 downward into its initial intermediate boxing position when the half-molds 14 occupy their molding joined position, as illustrated in FIG. 8.

So that the boxing path is appropriate for the different final container shapes, the lower stop face 70 is supported by a removable second element that is attached in a detachable way under the associated half-mold 14. In the embodiment shown in the figures, the lower stop face 70 is formed here by a portion of the upper face of the jaws 60.

As a variant, the lower stop face is located below the upper face of the jaws. The jaws then have a counterbore in their upper face. This makes it possible to cause the initial intermediate boxing position of the carriage to vary as a function of the shape of the final container and as a function of the length of the boxing path.

The mold bottom 16 has a stop face 72 that is intended to come into contact with the lower stop face 70. This stop face 72 forms a lower face of a second collet 74 that extends radially projecting from the mold bottom 16. This collet 74 is received in a counterbore 76 made in the lower face 47 of the half-molds 14, around the passage opening 46 of the mold bottom 16. This counterbore 76 makes it possible to free the portion of the upper face 62 of the jaws 60 that form the lower stop face 70.

The movements of the carriage 24 are controlled by two separate actuation means. Each actuation means makes it possible to perform a specific step of the boxing process.

First actuation means make it possible to move the carriage 24 relative to its fixed holder 26 between the lower position of the mold bottom 16 and its initial intermediate boxing position.

The first actuation means comprise elastic return means 78 that exert an elastic return force of the carriage 24 to its upper molding position. The elastic return means 78 are formed by a spring.

A lower collar 80 which is supported by the lower end of a bolt 82 with a vertical axis. The bolt 82 is screwed under the cover 36 of the fixed holder 26, parallel to the guiding portion 28 of the carriage 24. The lower collar 80 thus forms a fixed support point of the spring 78.

A longitudinal arm 84 extends from a lower end segment 86 of the guiding carriage 24 that is located under the guiding portion 28. The arm 84 carries a sleeve 88 that is mounted to slide on the bolt 82. The sleeve 88 is intended to house the spring 78. An upper end face of the sleeve 88 is arranged above the collar 80.

The spring 78 is inserted vertically between the lower collar 80 and the upper end face of the sleeve 88 to exert the vertical elastic return force of the carriage 24 to its upper molding position by resting on the collar 80.

The first actuation means also comprise a cam follower 90 that is supported by the carriage 24. The cam follower 90 here is formed by a roller that is mounted to rotate around a transverse axis on the lower end segment 86 of the carriage 24.

The cam follower 90 is intended to work with a longitudinal cam path 92, shown in a broken line in FIGS. 2, 5, 7, 8 and 10. The cam path 92 is formed by the lower face of a rail that is immobile relative to the ground on which the carousel that carries the molding unit 10 rests. Thus, when the carousel turns, the cam follower 90 enters into contact with the cam path 92 to make the carriage 24 slide to its lower position for extraction of the finished container, against the elastic return force of the spring 78, as shown in FIG. 2.

Finally, the first actuation means comprise an arming device that is able to exert an arming force on the carriage 24 to move it from its upper molding position to its initial intermediate boxing position against the elastic return force on an arming path directed downward.

The arming device is formed by at least one cylinder 94 that is inserted between the fixed holder 26 and the carriage 24. In the embodiment shown in the figures, the cylinder 94 is inserted vertically between a lower face of the cover 36 and a second arm 96 that extends transversely from the lower end segment 86 of the carriage 24.

The cylinder 94 has a body in which an actuation rod is mounted to slide. The body of the cylinder 94 is heavier than the sliding rod. To lighten the carriage 24, the body of the cylinder 94 is therefore fixed to the cover 36, while the free end of the sliding rod of the cylinder 94 is fixed to the carriage 24. This arrangement of the cylinder 94 also makes it possible to simplify the supplying of pneumatic fluid of the cylinder 94, because the body of the cylinder 94 is found on a fixed part rather than on the carriage.

These first actuation means thus make it possible to control the movements of the carriage 24 from its lower position for extraction to its upper molding position initially, by means of the spring 78 and of the cam path 92, then from its upper molding position to its initial intermediate boxing position secondly, by means of the cylinder 94.

The two actuation means that make it possible to perform the boxing operation comprise at least the cylinder 32 and a piston 98 that is housed in the cylinder 32. The piston 98 splits the cylinder 32 into an upper chamber and a lower work chamber 100.

Figure 9:
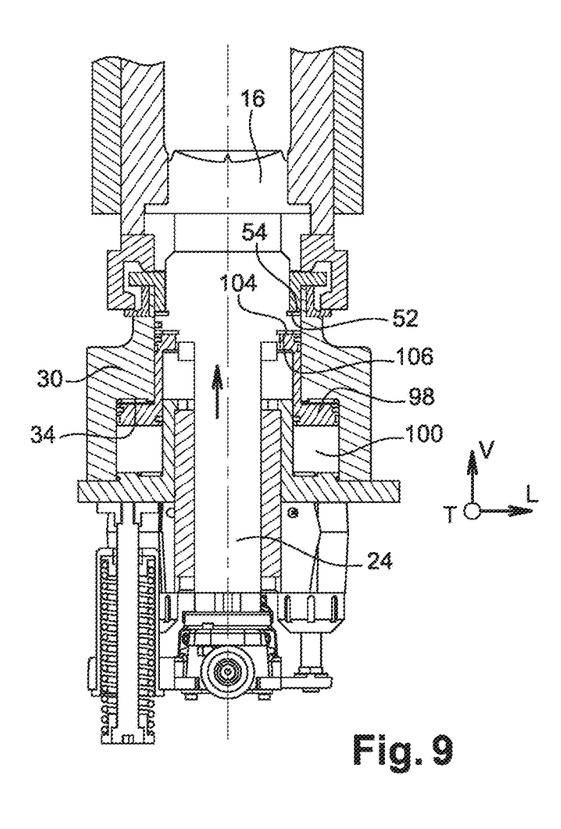
FIG. 9 is a view similar to that of FIG. 2 in which the half-molds occupy their joined position, while the mold bottom occupies its upper molding position in which it is held by the piston.

The piston 98 is mounted to slide vertically in the cylinder 32 between a lower position in which the piston 98 rests on the lower cover 36 and in which the work chamber 100 has a minimum volume, as illustrated in, for example, FIG. 2, and an upper position in which the piston 98 is situated near the upper wall 34 of the hood 30 and in which the work chamber 100 has a maximum volume, as illustrated in FIG. 9.

A central tube 102 extends upward from the center of the piston 98. An upper end face 104 of the tube 102 is able to draw a lower face 106 of the carriage 24 into the shaft 40 when the piston 98 is moved toward its upper position. The lower face 106 is formed here by a lower face of the first collet 56.

When the work chamber 100 of the cylinder 32 is pressurized, the piston 98 is able to exert a boxing force that pushes the mold bottom 16 on a directed boxing path from its initial intermediate boxing position to its upper molding position. The boxing path is reversed relative to the arming path.

The work chamber 100 is supplied with a high-pressure fluid, for example about 40 bars, so that the boxing force exerted by the piston 98 is much higher than the arming force that can be exerted by the cylinder 94 on the carriage 24. More particularly, the boxing force exerted by the piston 98 is greater than the sum of the arming force that can be exerted by the cylinder 94, the blow-molding pressure force exerted on the mold bottom and, if applicable, the force of the elongation rod. Thus, when the piston 98 is actuated while the cylinder 94 is still active, the carriage 24 is moved to its upper molding position against the arming force of the cylinder 94.

With this design, the cylinder 32 is fixed relative to the fixed holder 26. This makes it possible to lighten considerably the carriage 24 relative to the carriages of the state of the art. The production rate of the containers is thus able to be increased without a considerable increase in the power consumption by the blow-molding machine.

Further, the piston 98 slides freely relative to the carriage 24. In other words, the carriage 24 can slide between its lower extraction position and its upper molding position while the piston 98 remains fixed. This makes it possible to lighten still more the weight of the carriage 24.

The operation of the molding unit 10 when the process of forming a container with a boxing operation is used will now be described.

The process begins right after the extraction of the previously obtained final container by said molding unit 10. As shown in FIG. 2, the carriage 24 is then controlled in its lower extraction position by contact between the cam follower 90 and the cam path 92. The piston 98 and the cylinder 94 are at rest, thus the piston 98 occupies its lower position, and the rod of the cylinder 94 is withdrawn into the body of the cylinder 94. The half-molds 14 occupy their separated position for extraction, as shown in FIG. 4.

Figure 6:
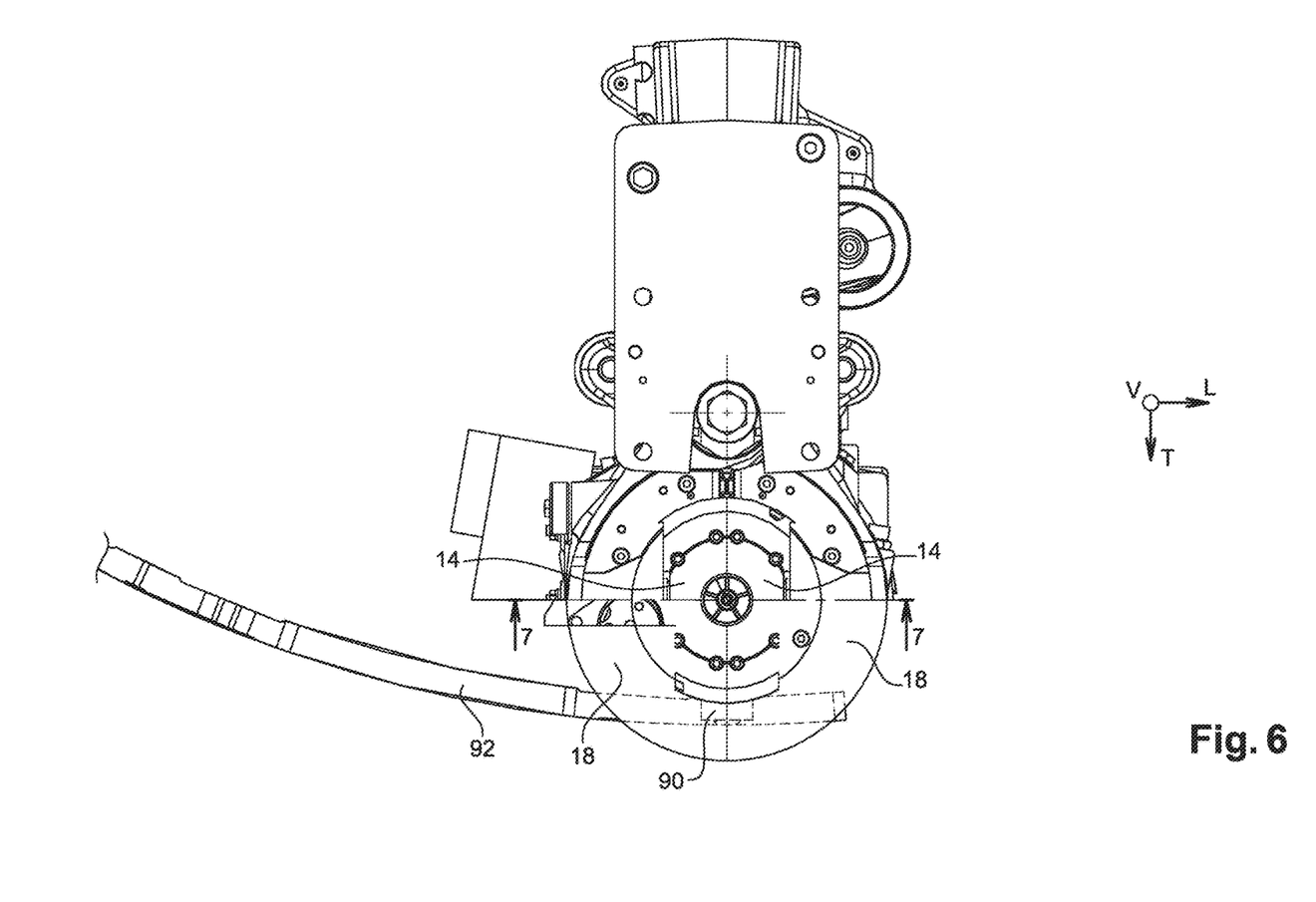
FIG. 6 is a top view similar to that of FIG. 4 in which the half-molds occupy their joined position.

During a first positioning step "E1," as shown in FIG. 5, the carousel continues its rotation, driving the cam follower 90 along the cam path 92. The carriage 24 is then elastically returned by the spring 78 toward its upper molding position. The first stop face 54 of the carriage 24 enters into contact with the upper stop face 52 of the guiding ring 48 to stop the carriage 24 in its upper molding position. During this movement of the carriage 24 upward, the half-molds 14 remain in separated extraction position, as shown in FIG. 4, to make possible the passage of the second stop face 72 above the upper stop face 70 of the jaws 60, regardless of the initial intermediate boxing position of the carriage 24 afterwards. As shown in FIG. 6, after a preform has been positioned between the half-molds 14, the half-molds 14 can then be closed in their molding joined position while the carriage 24 still occupies its upper molding position, as illustrated in FIG. 7. This makes it possible to guarantee that the collet 74 of the mold bottom 16 is confined vertically in the counterbore 76. The carousel continues its rotation, and the cam follower 90 is detached from the cam path 92.

In a variant of the invention, not shown, the cylinder 94 begins to be actuated before the half-molds 14 have reached their molding joined position. The carriage 24 thus begins its movement toward its intermediate position before the half-molds 14 are in a molding joined position. This makes it possible advantageously to reduce the time for implementing the process.

The operation of blow molding the preform is then begun.

A second arming step "E2" is then initiated before or during the blow-molding operation. In every case, the second arming step "E2" is performed before the deformed preform reaches the mold bottom 16 in the upper molding position.

As shown in FIG. 8, during this second arming step "E2," the carriage 24 is moved along its arming path downward by actuating the cylinder 94 against the elastic return force of the spring 78. The carriage 24 is then immobilized in its initial intermediate boxing position by contact with the second stop face 72 against the lower stop face 70 of the jaws 60. The mold bottom 16 is then vertically withdrawing downward relative to the impressions 15 of the half-molds 14.

When the preform is sufficiently deformed by blow molding to match the impressions 15 of the half-molds 14, a third boxing step "E3" is triggered. As shown in FIG. 9, during this third boxing step "E3," the carriage 24 is pushed very rapidly along its boxing path by the piston 98 so as to stretch the material of the preform during forming to form the base of the container.

To do this, the work chamber 100 is pressurized so that the piston 98 pushes the mold bottom 16 upward against the blow-molding fluid pressure filling the preform, and against the cylinder 94. The carriage 24 is stopped in its upper molding position by contact with its first stop face 54 with the upper stop face 52 of the stop ring 48.

The work chamber 100 is kept under pressure as long as the pressure of the blow-molding fluid is maintained in the container.

Figure 10:
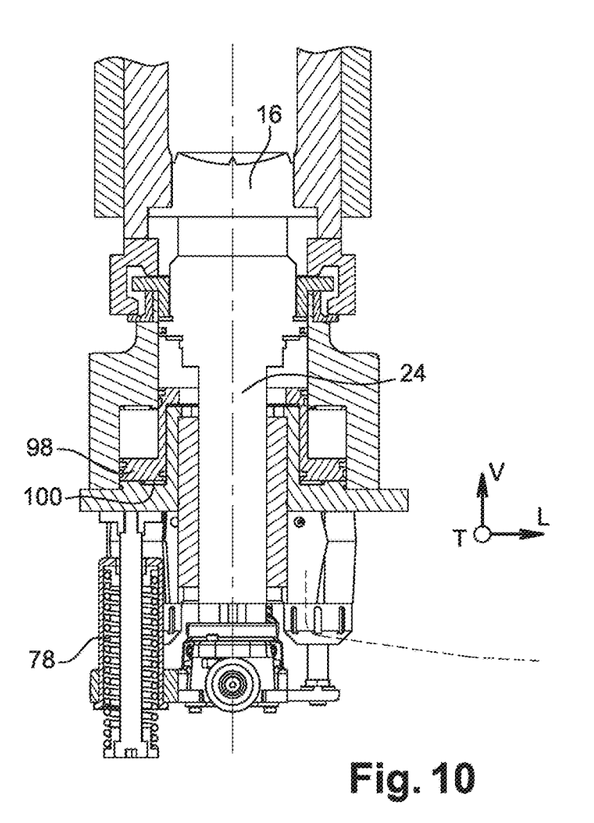
FIG. 10 is a view similar to that of FIG. 2 in which the half-molds occupy their joined position, while the mold bottom occupies its upper molding position, the piston being again at rest.

As shown in FIG. 10, when the final container is finally obtained, the blow-molding fluid is evacuated from the cavity of the mold. The pressure in the work chamber 100 is then lowered so as to cause the piston 98 to fall back downward. The mold bottom 16 remains held in its upper molding position by the elastic return force of the spring 78.

Finally, during a fourth and last step "E4" for extraction of the finished container, the carriage 24 is moved from its upper molding position to its lower extraction position, as shown in FIG. 2, after opening of the two half-molds 14 into their separated position, as shown in FIG. 4. The movement of the carriage 24 is controlled by contact of the cam follower 90 with the cam path 92.

The process can therefore be repeated for a new production cycle of a container.

The molding unit 10 is designed here so as to be able to be used also to produce containers without a boxing operation.

Figure 11:
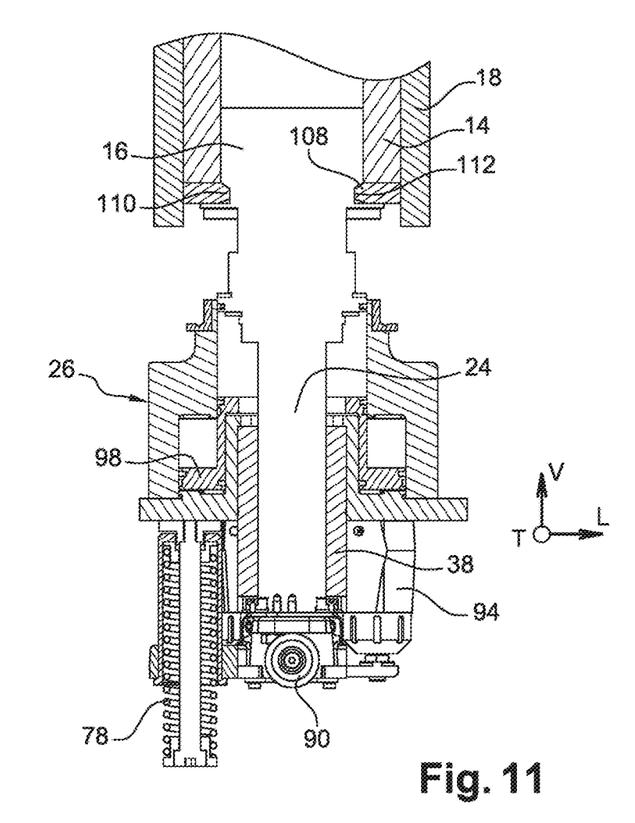
FIG. 11 is a view similar to that of FIG. 2 that shows the molding unit in a molding configuration without a boxing operation, in which the half-molds occupy their joined position, while the mold bottom occupies its upper molding position in which it is held by interlocking with the half-molds.

As shown in FIG. 11, when no boxing operation is required, the stop ring 48 is removed, and the jaws 60 are replaced by projections 108, also called wear washers, traditionally used in known molding units.

As a variant, the stop ring 48 remains fixed on the fixed holder 26 even when the forming process does not have a boxing operation. This is particularly possible when the carriage 24 does not need to be moved beyond the upper molding position defined by the stop ring 48 so that the mold bottom 16 completes the impression carried by the half-molds 14.

According to still another embodiment/characteristic of the invention, the jaws 60 can remain in place during the forming process without a boxing operation. This is particularly the case when the jaws 60 are mounted permanently on the mold carriers. In this case, the projections 108 are mounted directly on the half-molds 14, the jaws 60 remaining in place.

During a forming process without a boxing operation, the movement of the carriage 24 is controlled only by the cam follower 90 and by the cam path 92, as well as by the spring 78.

Thus, during a first positioning step, the carriage 24 is controlled up to its upper molding position by contact between the sleeve 88 and the cover 36.

The half-molds 14 are then controlled in their molding joined position by enclosing the mold bottom 16, as shown in FIG. 11. The projections 108 define a lug 110 that is received in a groove 112 of the mold bottom 16 so as to immobilize the mold bottom 16 vertically in both directions relative to the half-molds 14.

Then, the blow-molding operation takes place in a known way. When the final container is obtained, the half-molds 14 are controlled in their separated position for extraction, and then the carriage 24 is controlled toward its lower extraction position by contact between the cam follower 90 and the cam path 92. The finished container is then ejected. The process can be repeated for a new production cycle for the next container.

The molding unit 10 made according to the teachings of the invention thus makes it possible to make containers with or without a boxing operation.

The preparation of the molding unit 10 to go from one of the forming processes to the other is very simple. This preparation is generally performed during a stopping of the machine to make it possible to change the half-molds 14.

During this stop, only the stop ring 48 must be added or withdrawn during the stopping of the blow-molding machine to make possible the changing of a mold. The jaws or the projections can be attached to the half-molds 14 before the stopping of the blow-molding machine. Thus, the half-molds 14 previously equipped with jaws or suitable projections are mounted in the machine. In addition, such a molding unit 10 has a very lightweight carriage, because the second actuation means are supported by the fixed holder and not by the carriage, as is the case in the state of the art. The inertia of the carriage 24 is thereby very slight. This makes it possible to set the carriage 24 in motion very rapidly with an input of energy that is similar to that necessary to form a container without a boxing operation. It is thus possible to produce containers with a boxing operation with a rate similar to the production rate of containers produced without a boxing operation.

The invention claimed is:

1. Molding unit (10) for the forming of a container made of thermoplastic material by blow molding, particularly by stretch blow molding, of a preform, the molding unit (10) having:
    two half-molds (14) that are transversely mobile in relation to a fixed holder (26) between a molding joined position and a separated position for extraction of the finished container;
    a mold bottom (16) that is vertically mobile between a lower position for extraction of the finished container and an upper position for molding of a base of the container, the mold bottom (16) being able to be moved between the two half-molds (14) in the molding joined position over a directed path, termed boxing, that extends from an initial intermediate boxing position to its upper molding position;
    a carriage (24) that carries the mold bottom (16) and that is mounted to move in the fixed holder (26);
    first actuation means to move the carriage (24) relative to its fixed holder (26) between a lower position of the mold bottom (16) and its initial intermediate boxing position;
    second actuation means having at least one cylinder (32) housing a piston (98) sliding vertically that is able to push the mold bottom (16) over its boxing path by pressurizing a lower work chamber (100) of the cylinder (32);
    wherein the mold bottom (16) is supported in a fixed manner by the carriage (24), the cylinder (32) being fixed relative to the fixed holder (26).

2. Molding unit (10) according to claim 1, wherein the fixed holder (26) has an upper stop face (52) that limits the movement of the carriage (24) upward into the upper position of the mold bottom (16).

3. Molding unit (10) according to claim 2, wherein the upper stop face (52) is supported by a removable first element (48) that is attached in a detachable way on the fixed holder (26).

4. Molding unit (10) according to claim 1, wherein at least one of the half-molds (14) has a lower stop face (70) that limits the movement of the carriage (24) downward into its initial intermediate boxing position when the half-molds (14) occupy their molding joined position.

5. Molding unit (10) according to claim 4, wherein the lower stop face (70) is supported by a removable second element (60) that is attached in a detachable way under the associated half-mold (14).

6. Molding unit (10) according to claim 4, wherein the mold bottom (16) has a stop face (72) that is intended to come into contact with the lower stop face (70).

7. Molding unit (10) according to claim 1, wherein the first actuation means have elastic return means (78) that exert an elastic return force on the carriage (24) toward its upper molding position.

8. Molding unit (10) according to claim 7, wherein the first actuation means have a cam follower (90) that is supported by the carriage (24) and a cam path (92) that works with the cam follower (90) to make the carriage (24) slide to its lower position against the elastic return force.

9. Molding unit (10) according to claim 7, wherein the first actuation means have an arming device that can exert an arming force on the carriage (24) to move it from its upper position to its initial intermediate boxing position against the elastic return force over a directed reverse arming path relative to the boxing path.

10. Molding unit (10) according to claim 9, wherein the first actuation means have a cylinder (94) that is supported by the fixed holder (26).

11. Molding unit (10) according to claim 10, wherein the arming force that can be exerted by the cylinder (94) is much less than the boxing force that can be exerted by the piston (98) on the carriage (24).

12. Molding unit (10) according to claim 1, wherein the piston (98) slides freely in relation to the carriage (24), the carriage (24) being able to slide between its lower position and its upper position while the piston (98) remains fixed.

13. Process of forming a container by blow molding of a preform using the molding unit (10) made according to claim 1, wherein it comprises chronologically:
    a first, positioning step (E1), the mold bottom (16) initially occupying its lower position and the half-molds (14) initially occupying their separated position, during which the mold bottom (16) is moved to its upper position, then during which the two half-molds (14) are moved to their molding joined position;
    then, a second, arming step (E2) during which the carriage (24) is moved along its arming path to its initial intermediate boxing position;
    then, a third, boxing step (E3) that takes place during the forming of a preform inserted into the mold after the first step (E1), and during which the carriage (24) is moved along its boxing path by means of the piston (98) so as to stretch the material of the preform in the process of forming to form the base of the container;
    then, a fourth step (E4) for extraction of the finished container during which the carriage (24) is moved from its upper position to its lower position after opening the two half-molds (14) in their separated position.

14. Molding unit (10) according to claim 5, wherein the mold bottom (16) has a stop face (72) that is intended to come into contact with the lower stop face (70).

15. Molding unit (10) according to claim 8, wherein the first actuation means have an arming device that can exert an arming force on the carriage (24) to move it from its upper position to its initial intermediate boxing position against the elastic return force over a directed reverse arming path relative to the boxing path.

\* \* \* \* \*